United States Patent [19]

Ishizuka

[11] Patent Number: 5,638,233
[45] Date of Patent: Jun. 10, 1997

[54] MAGNETIC DISK DRIVE MOTOR HAVING A FIXED SHAFT WITH CIRCUMFERENTIAL GROOVES FOR INTEGRATING THE BEARING THEREWITH AND HAVING A DISC ABUTTING THE OUTER RING OF THE BEARING

[75] Inventor: Yutaka Ishizuka, Nagano, Japan

[73] Assignee: Kabushiki Kaisha Sankyo Seiki Seisakusho, Nagano, Japan

[21] Appl. No.: 552,173

[22] Filed: Nov. 2, 1995

Related U.S. Application Data

[63] Continuation of Ser. No. 133,877, Oct. 12, 1993, abandoned.

[30] Foreign Application Priority Data

Oct. 12, 1992 [JP] Japan ................. 4-298211

[51] Int. Cl.$^6$ ................................ G11B 17/028
[52] U.S. Cl. ..................... 360/99.08; 360/99.12
[58] Field of Search .................. 360/99.08, 98.07, 360/99.12, 98.08; 384/446, 478, 488, 493, 505, 514, 912; 310/90; 369/269–270

[56] References Cited

U.S. PATENT DOCUMENTS

| | | | |
|---|---|---|---|
| 3,826,545 | 7/1974 | McKee | 384/493 |
| 4,306,259 | 12/1981 | Saito et al. | 360/99.08 |
| 4,480,881 | 11/1984 | Fujimori | 384/446 |
| 4,677,509 | 6/1987 | Nishida et al. | 360/97 |
| 4,701,651 | 10/1987 | Tanaka | 384/446 |
| 4,775,908 | 10/1988 | Ycas | 360/106 |
| 4,810,108 | 3/1989 | Yajima | 384/488 |
| 4,896,239 | 1/1990 | Ghose | 360/106 |
| 4,907,897 | 3/1990 | Shirotori | 384/478 |
| 4,934,837 | 6/1990 | Kawamura | 384/489 |
| 5,045,738 | 9/1991 | Hishida et al. | 369/269 |
| 5,128,574 | 7/1992 | Koizumi et al. | 310/90 |
| 5,195,002 | 3/1993 | Sakurai | 360/99.08 |
| 5,200,866 | 4/1993 | Frugé et al. | 360/99.08 |
| 5,207,514 | 5/1993 | Weissgerber | 384/497 |
| 5,210,665 | 5/1993 | Nishizawa | 360/99.08 |
| 5,247,409 | 9/1993 | Sakaguchi | 360/99.08 |

FOREIGN PATENT DOCUMENTS 63-00859  1/1988  Japan ................. 360/99.08

*Primary Examiner*—Stuart S. Levy
*Assistant Examiner*—Brian E. Miller
*Attorney, Agent, or Firm*—Sughrue, Mion, Zinn Macpeak & Seas

[57] ABSTRACT

A magnetic disc drive motor contains a frame; a fixed shaft mounted on the frame and provided with two circumferential grooves; a bearing member including: a plurality of balls disposed in the circumferential grooves; upper and lower roller rings mounted on the fixed shaft through the balls disposed in the circumferential grooves; a pre-loading spring mounted between the upper and lower roller rings; a rotor fixed to one end of the lower roller ring and provided with a loading surface formed in its upper surface; and a motor member mounted below the rotor, wherein the upper and lower roller rings are exposed above the upper surface of the rotor, the roller rings are fitted in center holes of magnetic discs, and inner peripheral portions of the magnetic discs are loaded on a loading surface of the rotor.

4 Claims, 3 Drawing Sheets

MAGNETIC DISK DRIVE MOTOR HAVING A FIXED SHAFT WITH CIRCUMFERENTIAL GROOVES FOR INTEGRATING THE BEARING THEREWITH AND HAVING A DISC ABUTTING THE OUTER RING OF THE BEARING

This is a Continuation of Application Ser. No. 08/133,877 filed Oct. 12, 1993 now abandoned.

BACKGROUND OF THE INVENTION

1. Field of the Invention

This invention relates to a magnetic disc drive motor, and particularly relates to a rotating support device for rotatably supporting a magnetic disc.

2. Related Art

The examples of conventional magnetic disc motors built into hard disc drive devices are shown in FIGS. 4 and 5. In the magnetic disc drive motor shown in FIG. 4, a shaft 2 is mounted in a frame 1, and two ball bearings 3, 3 are mounted on the shaft 2. A hub 4 is mounted on the ball bearings 3, 3. The central portion of the hub 4 is cylindrical-shaped, and this cylindrical central portion is open at its upper and lower ends. Two magnetic discs 5 are mounted on the outer peripheral surface of the cylindrical central portion. A seal cover 6 covers the opening at the upper end of the hub 4 and is fixed in position there by an adhesive 7.

An armature core 8 is secured on the frame 1, and a drive magnet 9 is mounted on the inner surface of the cylindrical peripheral portion of the hub 4. The armature core 8 has a number of salient poles, and a coil 10 is wound around each of the salient poles. The outer surface of the armature core 8 faces the inner surface of the drive magnet 9 across a radial gap. When the armature core 8 is excited with an electric current it causes the drive magnet 9 to rotate, and the hub 4 rotates integrally with the drive magnet 9.

In the magnetic disc drive motor shown in FIG. 5, in order to make the device smaller and thinner, the motor is housed directly inside the hub on which the magnetic discs are loaded. A cylindrical support 12 is formed in the central part of a frame 11, and two ball bearings 13, 13 are mounted on the inner surface of this support 12. A shaft portion 15, integral with the hub 14, is rotatably mounted in the bearings 13, 13. The magnetic discs 5 are mounted on the outside of the hub 14.

An armature core 16 is mounted on the outer surface of the support 12 of the frame 11, a drive magnet 17 is fixed on the inner surface of the hub 14, the armature core 16 and the drive magnet 17 and other parts form a motor, this motor rotates the drive magnet 17 so as to rotate the hub 14 together with the drive magnet 17.

In the conventional magnetic disc drive motors described above, because they incorporate the hub 4 for mounting the magnetic discs 5, the precision of coupling the hub 4 with the ball bearings 3 and the precision of machining the hub 4 directly affect the precision with which the magnetic discs 5 rotate, and the precision with which the magnetic discs 5 rotate is therefore impaired. Also, because the diametral thickness of the hub 4 has to be accommodated, there is the problem that it is difficult to reduce the size of the motor, and, in particular, when high density magnetic discs 5 which are both of small diameter and capable of high density recording are used, because the diameters of the shaft 2 and the ball bearings 3 have to be made small, problems such as shaft deflection occur, and the practical application of these high performance discs is difficult.

SUMMARY OF THE INVENTION

In view of the foregoing problem, an object of the present invention is to provide a magnetic disc drive motor which has a simple and compact construction and with which highly precise rotation can be achieved.

An aspect of the present invention, there is provided a magnetic disc drive motor comprising: a frame; a fixed shaft mounted on the frame and provided with two circumferential grooves; a bearing member including: a plurality of balls disposed in the circumferential grooves; upper and lower roller rings mounted on the fixed shaft through the balls disposed in the circumferential grooves; a pre-loading spring mounted between the upper and lower roller rings; a rotor fixed to one end of the lower roller ring and provided with a loading surface formed in its upper surface; and a motor member mounted below the rotor, wherein the upper and lower roller rings are exposed above the upper surface of the rotor, the roller rings are fitted in center holes of magnetic discs, and inner peripheral portions of the magnetic discs are loaded on a loading surface of the rotor.

According to this invention, because the bearings are integrated with the shaft, and because the magnetic discs are mounted with their inner edges fitted in direct contact with the roller rings of the bearings and with their inner edge portions loaded on the loading surface of the rotor, the magnetic discs can be rotated with a high degree of precision on high precision integrated-shaft type bearings without being affected by the precision of the fit between any hub and the ball bearings or the precision with which any hub is machined, and the realization of high capacity disc drives is therefore made easy.

Furthermore, because the bearings have no inner rings, magnetic discs having small center holes can be used, and when magnetic discs having regular sized center holes are used the diameter of the fixed shaft can be increased and therefore the strength and vibration resistance of the shaft can be increased. And, because the hub that has conventionally been necessary is no longer needed, the motor can easily be made smaller, and the cost of the hub can be saved.

DETAILED DESCRIPTION OF THE PREFERRED EMBODIMENTS

Figure 1:
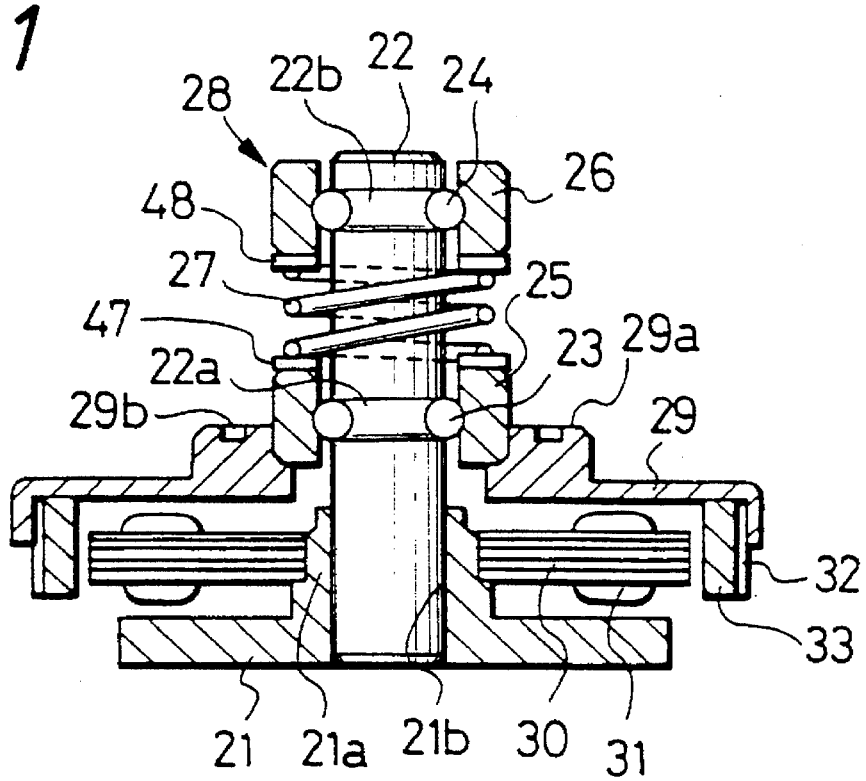
FIG. 1 is a cross-sectional view of a magnetic disc drive motor constructed according to a first preferred embodiment of the present invention.

A first preferred embodiment of a magnetic disc drive motor according to the present invention will now be described, with reference to the accompanying drawings. In FIG. 1, a boss portion 21a projects up from the central portion of a frame 21, and a cylindrical fixed shaft 22 is mounted in an axial center hole 21b formed in the boss portion 21a. The fixed shaft 22 does not have to be a separate member from the frame 21, as it is in FIG. 1, and can instead be formed as an integral part of the frame 21, projecting vertically upwardly from the central portion of the frame 21.

An lower-upper pair of circumferential grooves 22a and 22b are formed in the fixed shaft 22, a number of balls 23, 24 are disposed in the circumferential grooves 22a and 22b, and lower and upper roller rings 25 and 26 are rotatably mounted on the fixed shaft 22 through the balls 23, 24. Also, a coil spring 27 for preloading the bearings is interposed between the lower and upper roller rings 25 and 26. The pre-loading coil spring 27 exerts an elastic force on both the roller rings 25 and 26 in opposite directions, tending to push them away from each other, and this force serves as a pre-load for preventing vibration and bearing shake from occurring when the roller rings 25, 26 rotate. In FIG. 1, the reference numerals 47 and 48 denote spacers mounted between the roller rings 25, 26 and the spring 27. When this kind of integrated-shaft type bearing construction is used, the diameter of the bearings can be reduced by an amount corresponding to the diametral thickness of the inner bearing rings which have been dispensed with.

A generally plate-shaped rotor 29 is mounted on the lower end of the lower roller ring 25, and is thereby rotatably mounted on the fixed shaft 22. This rotor 29 is provided with a loading surface 29a formed in a plane perpendicular to the fixed shaft 22.

An armature core 30 is mounted on a step portion formed in the outer surface of the boss portion 21a of the frame 21; this armature core 30 has a number of salient poles on its outer side, and a coil 31 is wound around each of the salient poles; the armature core 30 and the coils 31 make up a stator section. A drive magnet 33 is mounted on the inner surface of the cylindrical peripheral portion of the rotor 29 through a back yoke 32 consisting of a magnetic body such as a steel plate; the back yoke 32 and the drive magnet 33 make up a rotor section. The outer surface of the armature core 30 and the inner surface of the drive magnet 33 face each other. The armature core 30, the drive magnet 33, and the coils 31, etc., make up a motor section; this motor section rotates the drive magnet 33, and the rotor 29 and both the roller rings 25, 26 rotate together with the drive magnet 33.

Figure 2:
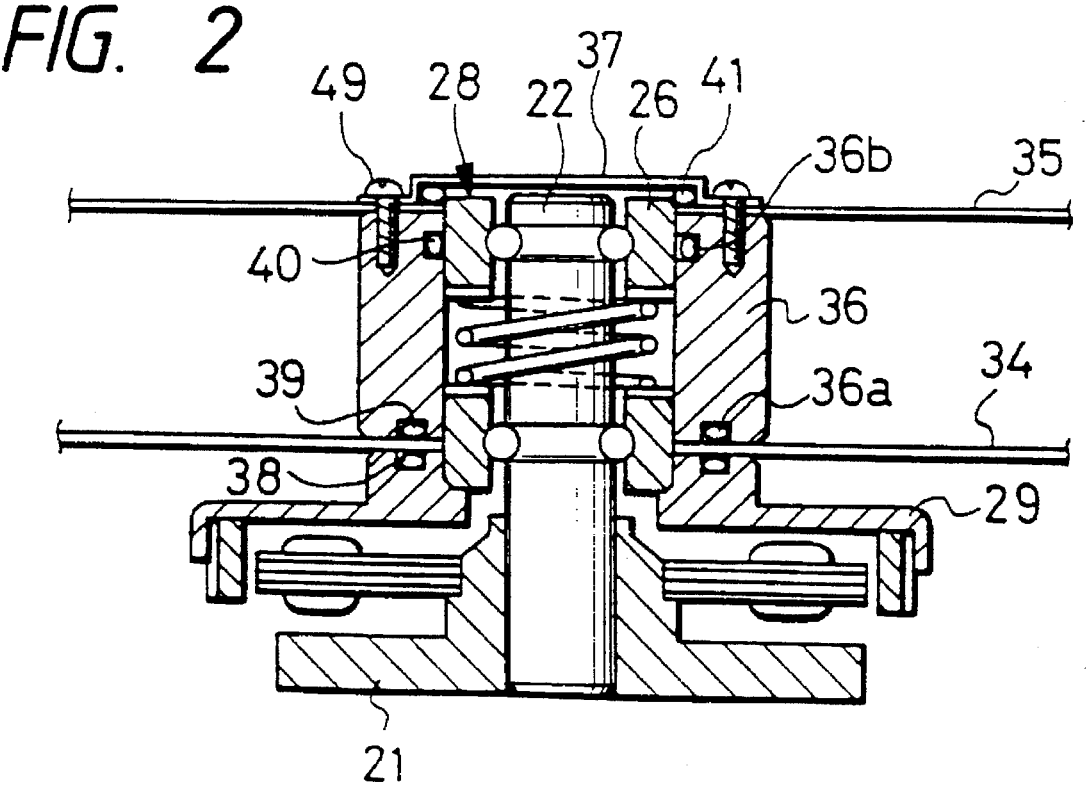
FIG. 2 is a cross-sectional view of the magnetic disc drive motor of FIG. 1 loaded with magnetic discs.

As shown in FIG. 2, inner holes of magnetic discs 34 and 35 are fitted on the roller rings 25 and 26, respectively. The magnetic disc 34 is fitted on the lower roller ring 25, and the inner peripheral portion of the magnetic disc 34 is positioned on the loading surface 29a of the rotor 29. A disc spacer 36 is positioned on the upper surface of the magnetic disc 34, and the magnetic disc 35, fitted on the upper roller ring 26, is mounted on top of the disc spacer 36. A disc clamper 37 is mounted on top of the magnetic disc 35, and the disc clamper 37 and the magnetic disc 35 are both fixed to the disc spacer 36 by screws 49.

A circular groove 29b of rectangular cross-section is provided in the loading surface 29a of the rotor 29, and an O-ring 38 is fitted in this circular groove 29b. Similarly, a circular groove 36a is formed in the lower surface of the disc spacer 36, facing the circular groove 29b, another circular groove 36b is formed in the inner surface of the disc spacer 33, facing the upper roller ring 26, and O-rings 39 and 40 are fitted in these circular grooves 36a and 36b respectively. Also, another O-ring 41 is provided between the disc clamper 37 and the magnetic disc 35. These O-rings all function as sealing means.

In loading the magnetic discs 34 and 35 onto the device, first the magnetic disc 34 is fitted over the lower roller ring 25 and positioned on the loading surface 29a of the rotor 29. Then the disc spacer 36 is fitted into place and, with the O-rings 38, 39, and 40 compressed, fixed with adhesive or the like to the roller rings 25 and 26. Then the O-ring 41 is positioned on the upper surface of the magnetic disc 35, the disc clamper 37 is positioned on top of the O-ring 41, and the screws 42 are screwed into the disc spacer 36, compressing the O-ring 41 and holding it in place between the magnetic disc 35 and the disc clamper 37. Positioning the O-rings 38–41 in this way results in the space in which the bearings 28 are mounted being sealed off from the outside, and consequently any dust or oil mist or the like that might be sprayed out from the bearings 28 is prevented from getting out onto the recording surfaces of the magnetic discs 34 and 35. These O-rings can be dispensed with when the bearings 28 produce negligible quantities of dust or are themselves well sealed.

Figure 3:
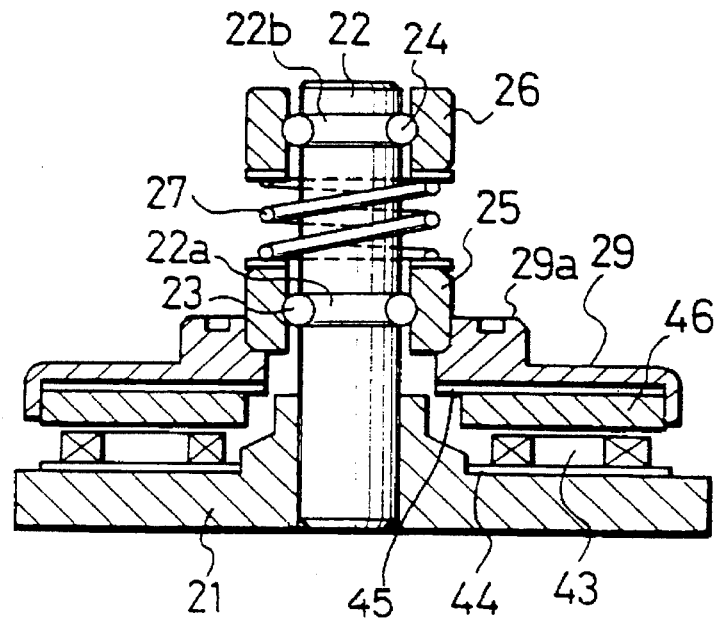
FIG. 3 is a cross-sectional view of a second preferred embodiment.
Figure 4:
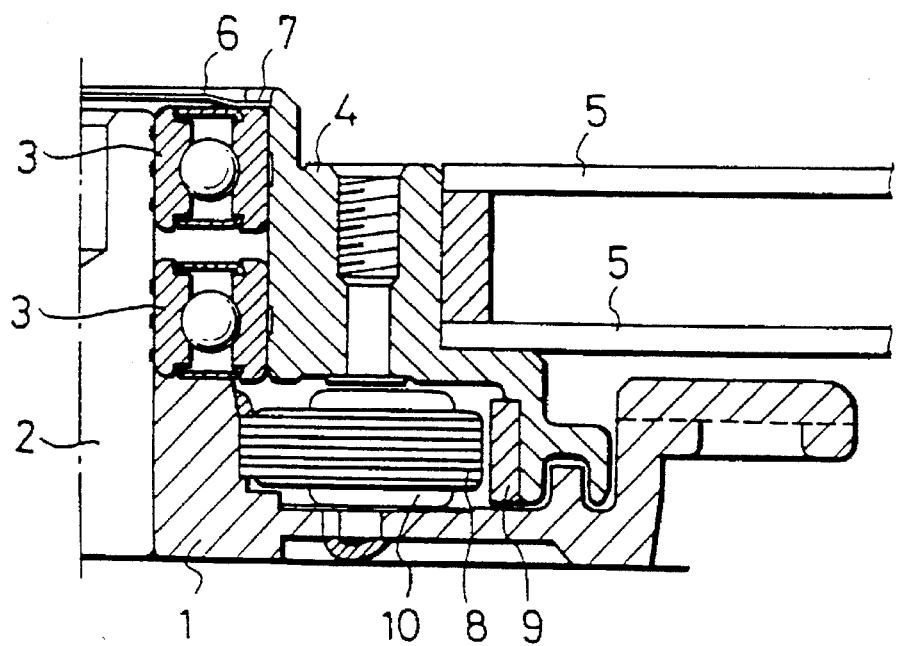
FIG. 4 is a cross-sectional view of a conventional magnetic disc drive motor.
Figure 5:
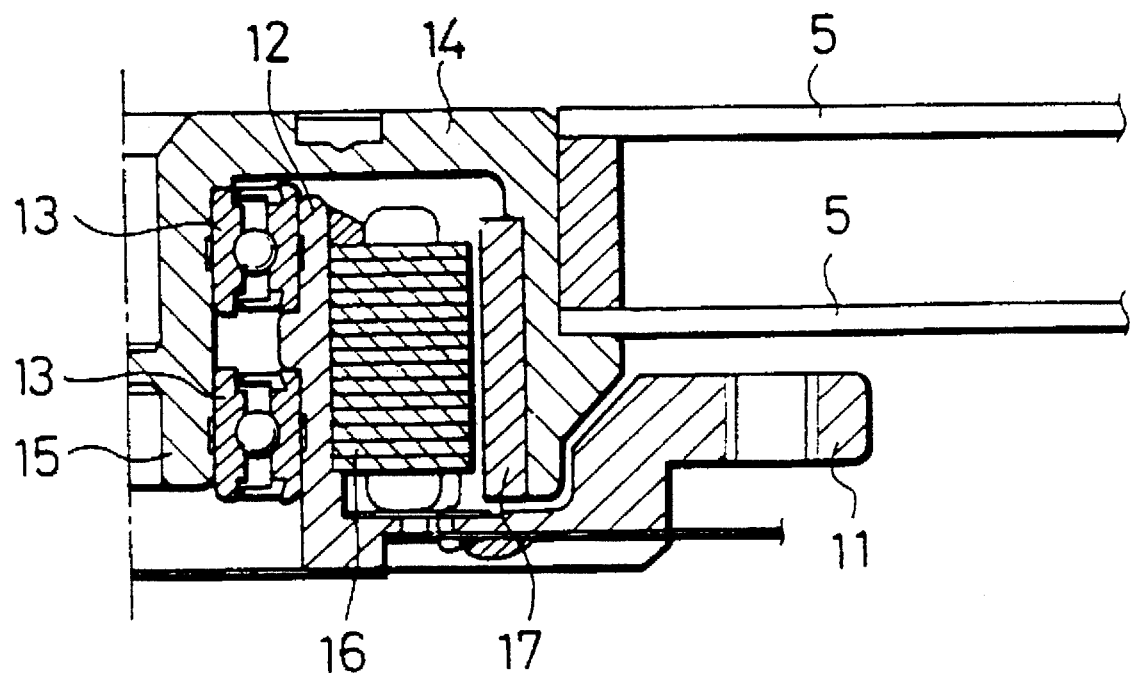
FIG. 5 is a cross-sectional view of another conventional magnetic disc drive motor.

A second preferred embodiment of a magnetic disc drive according to the present invention is shown in FIG. 3. In this second preferred embodiment, the motor section is constructed in such a way that the gap between the rotor magnet and the stator magnet exists in the axial direction thereof. A stator section is made up of a number of armature coils 43, divided into for example three phases, mounted on a stator base 44 mounted on a level surface of the frame 21. A rotor section is made up of a donut-shaped drive magnet 46 mounted on a back yoke 45, consisting of a magnetic body such as a steel plate, mounted on the underside of the rotor 29. The drive magnet 46 and the armature coils 43 face each other across an axial gap, and when the armature coils 43 are excited by an electric current they rotate the drive magnet 46. The rotor 29 and the roller rings 25 and 26 of the bearings 28 rotate integrally with the drive magnet 46. Apart from the motor section described above, this second preferred embodiment is identical in construction to the first preferred embodiment, and therefore a description here of the rest of the construction of the second preferred embodiment will be omitted.

It should be noted that the present invention is not limited to the first and second preferred embodiments described above, and various changes can be made to the constructions described above without exceeding the scope of the present invention. For example, a magnetic fluid seal can be disposed between the inner cylindrical surface of the rotor, below the lower roller ring 25, and the fixed shaft, to prevent dust from the bearings 28 from passing to the outside through the motor section.

As is clear from the above description, with a magnetic disc drive motor according to this invention, because the bearings are integrated with the shaft, and because the magnetic discs are mounted with their inner edges fitted in direct contact with the roller rings of the bearings and with their inner edge portions loaded on the loading surface of the rotor, the magnetic discs can be rotated with a high degree of precision on high precision integrated-shaft type bearings without being affected by the precision of the fit between any hub and the ball bearings or the precision with which any hub is machined, and the realization of high capacity disc drives is therefore made easy.

Furthermore, because the bearings have no inner rings, magnetic discs having small center holes can be used, and when magnetic discs having regular sized center holes are used the diameter of the fixed shaft can be increased and therefore the strength and vibration resistance of the shaft can be increased. And, because the hub that has conventionally been necessary is no longer needed, the motor can easily be made smaller, and the cost of the hub can be saved.

What is claimed is:

1. A magnetic disk drive motor comprising:

a frame;

a fixed shaft having a lower shaft portion fixedly mounted on the frame and an upper shaft portion provided with two circumferential grooves;

a bearing member including:
- a plurality of balls disposed in the circumferential grooves;
- upper and lower roller rings mounted on the upper shaft portion of the fixed shaft through the balls disposed in the circumferential grooves;
- a pre-loading spring mounted between the upper and lower roller rings and which exerts an elastic force on both the upper and lower roller rings in opposite directions thereby tending to push the upper and lower roller rings away from each other;

a rotor fixed to a lower end of the lower roller ring and provided with a loading surface formed in its uppermost surface; and a motor member mounted below the rotor, wherein the upper shaft portion protrudes above the uppermost surface of the rotor such that the upper roller ring, the pre-loading spring, and at least an upper portion of the lower roller ring are positioned above the uppermost surface of the rotor the upper and lower roller rings respectively abutting inner edge portions of magnetic discs, and wherein inner peripheral portions of the magnetic discs are loaded on the loading surface of the rotor.

2. A magnetic disc drive motor as claimed in claim 1, wherein the rotor is plate-shaped, and further comprising an armature core fixed to the frame, a drive magnet fixed to the inner surface of an inner peripheral portion of the rotor, and wherein an inner surface of the drive magnet and the outer surface of the armature core face each other.

3. A magnetic disc drive motor as claimed in claim 1, wherein the rotor is plate-shaped, and further comprising a stator base with a plurality of armature coils mounted thereon and which is fixed to the frame, a drive magnet which is fixed to the inner surface of the rotor, and wherein the drive magnet and the armature coils face each other with an axial predetermined gap.

4. A magnetic disc drive device as claimed in claim 1, further comprising:

sealing member disposed on the loading surface of the rotor and disposed on a disc clamper for clamping the magnetic disc.

* * * * *